United States Patent
Gstöhl et al.

(10) Patent No.: US 10,370,023 B2
(45) Date of Patent: Aug. 6, 2019

(54) PRODUCTION METHOD FOR A MODULAR STEERING COLUMN HAVING EXTRUDED PROFILED ELEMENTS

(71) Applicants: THYSSENKRUPP PRESTA AG, Eschen (LI); thyssenkrupp AG, Essen (DE)

(72) Inventors: Eric Gstöhl, Eschen (LI); Sven Hausknecht, Dornbirn (AT); Stefan-Hermann Loos, Heerbrugg (CH); Frank Pasch, Buchs (CH); Christian Geissler, Buchs (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 65 days.

(21) Appl. No.: 15/542,105

(22) PCT Filed: Sep. 22, 2015

(86) PCT No.: PCT/EP2015/071742
§ 371 (c)(1),
(2) Date: Jul. 7, 2017

(87) PCT Pub. No.: WO2016/110335
PCT Pub. Date: Jul. 14, 2016

(65) Prior Publication Data
US 2018/0273082 A1    Sep. 27, 2018

(30) Foreign Application Priority Data

Jan. 8, 2015 (DE) .................. 10 2015 000 028

(51) Int. Cl.
*B62D 1/185*    (2006.01)
*B62D 1/16*    (2006.01)
(Continued)

(52) U.S. Cl.
CPC .............. *B62D 1/185* (2013.01); *B23P 15/00* (2013.01); *B62D 1/16* (2013.01); *B62D 1/184* (2013.01); *B21C 23/02* (2013.01); *B23P 2700/50* (2013.01)

(58) Field of Classification Search
CPC .......... B62D 1/185; B62D 1/16; B62D 1/184; B23P 15/00; B23P 2700/50; B21C 23/02
See application file for complete search history.

(56) References Cited

U.S. PATENT DOCUMENTS 6,948,741 B2    9/2005  Manwaring
8,596,160 B2   12/2013  Nagamura
(Continued)

FOREIGN PATENT DOCUMENTS

CN    102416976 A    4/2012
CN    103370255 A   12/2013
(Continued)

OTHER PUBLICATIONS

English translation of International Search Report issued in PCT/EP2015/071742, dated Dec. 17, 2015 (dated Jan. 4, 2016).

*Primary Examiner* — Drew J Brown
(74) *Attorney, Agent, or Firm* — thyssenkrupp North America, Inc.

(57) ABSTRACT

A method may be used to produce a steering column for a motor vehicle that includes an inner steering column tube that receives a steering shaft such that the steering shaft is rotatable about its longitudinal axis, an outer steering column tube that receives the inner steering column tube and has a longitudinal slot that extends in a direction of the longitudinal axis, and a clamping apparatus that can be switched over between a release position in which the inner steering column tube is adjustable relative to the outer steering column tube and a fixing position in which the inner steering column tube is fixed relative to the outer steering (Continued)

Figure 1:
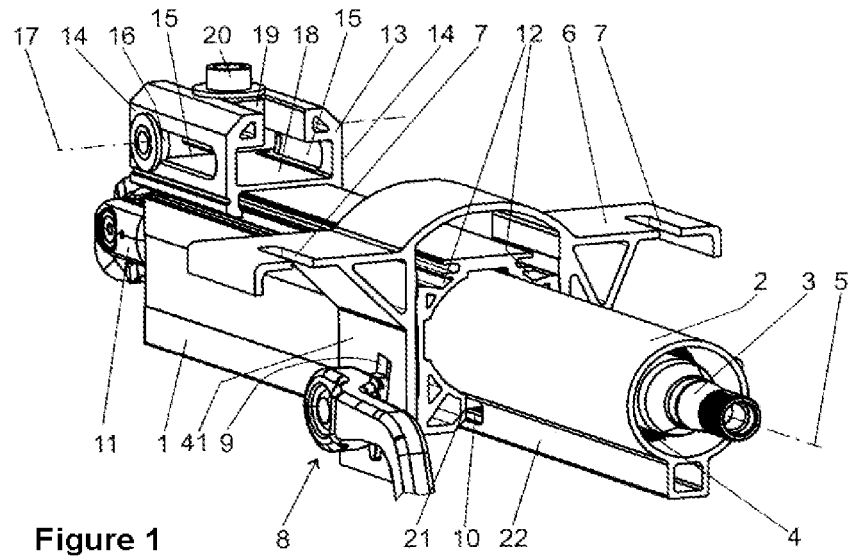

column tube. The longitudinal slot may have a greater width in the release position than in the fixing position. The method may involve, amongst other steps, manufacturing at least one single blank of the outer steering column tube and/or of the inner steering column tube using an extrusion process.

14 Claims, 3 Drawing Sheets

(51) Int. Cl.
  *B62D 1/184* (2006.01)
  *B23P 15/00* (2006.01)
  *B21C 23/02* (2006.01)

(56) References Cited

U.S. PATENT DOCUMENTS

| | | | |
|---|---|---|---|
| 8,863,609 B2 | 9/2014 | Tinnin | |
| 2009/0038428 A1* | 2/2009 | Abe | B21D 26/023 74/492 |
| 2011/0215614 A1* | 9/2011 | Mani | B23P 15/00 296/193.02 |
| 2012/0247258 A1* | 10/2012 | Maniwa | B62D 1/184 74/493 |
| 2013/0199328 A1* | 8/2013 | Yamamoto | B62D 1/16 74/493 |
| 2014/0196564 A1 | 7/2014 | Bang | |
| 2014/0260759 A1 | 9/2014 | Tinnin | |
| 2014/0284910 A1* | 9/2014 | Schnitzer | B62D 1/184 280/779 |
| 2014/0346761 A1* | 11/2014 | Schnitzer | B62D 1/16 280/779 |
| 2015/0000456 A1* | 1/2015 | Schnitzer | B62D 1/16 74/493 |
| 2015/0367876 A1* | 12/2015 | Heitz | B29C 70/52 74/492 |
| 2017/0050228 A1* | 2/2017 | Sato | B21D 22/28 |
| 2017/0253262 A1* | 9/2017 | Tanaka | B62D 1/184 |
| 2018/0001922 A1* | 1/2018 | Gstohl | B62D 1/16 |
| 2018/0099689 A1* | 4/2018 | Kurita | B62D 1/16 |
| 2018/0265115 A1* | 9/2018 | Gstohl | B62D 1/16 |

FOREIGN PATENT DOCUMENTS

| | | |
|---|---|---|
| DE | 60311455 T | 8/2007 |
| DE | 112008003076 T | 9/2010 |
| DE | 102011054598 B | 1/2013 |
| DE | 10201400534 A | 7/2014 |
| FR | 3004154 A | 10/2014 |
| KR | 20080071323 A | 8/2008 |
| WO | 2001064497 A | 9/2001 |
| WO | 2006118054 A | 11/2006 |
| WO | 2008086548 A | 7/2008 |

\* cited by examiner

PRODUCTION METHOD FOR A MODULAR STEERING COLUMN HAVING EXTRUDED PROFILED ELEMENTS

CROSS REFERENCE TO RELATED APPLICATIONS

This application is a U.S. National Stage Entry of International Patent Application Serial Number PCT/EP2015/071742, filed Sep. 22, 2015, which claims priority to German Patent Application No. DE 10 2015 000 028.4 filed Jan. 8, 2015, the entire contents of both of which are incorporated herein by reference.

FIELD

The present disclosure generally relates to steering columns, including methods for producing steering columns having extruded profiled elements.

BACKGROUND

Steering columns have a wide variety of functions in motor vehicles. Firstly, they serve to fasten the steering wheel and to mount the steering shaft or steering spindle on the vehicle body. They also serve to fasten attachment parts, such as an anti-theft device or operating elements. The steering columns can partially also be adjusted mechanically or electrically in the axial direction and vertical direction, in order for it to be possible to adapt the position of the steering wheel to the requirements of the driver. Finally, steering columns are also to yield in a controlled manner in the case of an impact of the vehicle on an obstacle, in order to absorb impact energy of the driver onto the steering wheel and, as a result, to reduce the risk of injury for the driver. In the case of all said requirements, moreover, there is a requirement that steering columns take up a small amount of installation space, have a low weight, and operate without play and noise.

One possibility of designing steering columns to be inexpensive and light consists in the use of extruded profiles. Extruded profiles have the advantage of low production costs in comparison with high pressure die cast components.

Therefore, steering columns are already known from the prior art, in which steering columns extruded profiles are used. Document U.S. Pat. No. 8,863,609 B2 discloses, for example, a steering column, in which the steering column tube unit, more precisely the outer steering column tube, is produced from an extruded profile. Said steering column has the special feature that the clamping axle for releasing and blocking the adjustment acts on the outer steering column tube on one side and does not pass through to the other side of the steering column tube.

Document FR 3004154 discloses a steering column tube unit for a steering column, the steering column tube unit being manufactured from an extruded profile. The various required functional sections are, for example, fastening regions, guides for the adjusting function, bearing seats and attachment points for additional components.

BRIEF DESCRIPTION OF THE FIGURES

FIG. 1 is a perspective view of an example steering column.

FIG. 2 is a longitudinal section view from a side of the steering column of FIG. 1.

FIG. 3 is a longitudinal section view from a side of the steering column of FIG. 2 in another adjustment position.

FIG. 4 is a longitudinal section view from a side of the steering column of FIGS. 2 and 3 in a pushed-together position following an impact.

FIG. 5 is a side perspective view of the steering column of FIG. 1 facing away from the steering wheel.

FIG. 6 is a cross sectional view through an example steering column in a region of a clamping axle.

FIG. 7 is a perspective detail view of an example steering column arrangement with a separated inner steering column tube.

FIG. 8 is a cross sectional view illustrating an example carrying element.

FIG. 9 is a perspective view of an example outer steering column tube with a separated carrying element.

FIG. 10 is an exploded view of an example carrying carriage amongst other components.

FIG. 11 is a perspective view of an example outer steering column tube with a separated carrying element along with an illustrated pivot axis.

FIG. 12 is a diagrammatic view illustrating production of an outer steering column tube using an extrusion process with indicated points of separation for severing an extruded profile into individual blanks for outer steering column tubes.

FIG. 13 is a side view illustrating example outer steering column tubes of various length with the uniform position of a functional region.

FIG. 14 is a side view of two example inner steering column tubes, in a case where the position of a functional region is shown.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting ‘a’ element or ‘an’ element in the appended claims does not restrict those claims to articles, apparatuses, systems, methods, or the like having only one of that element, even where other elements in the same claim or different claims are preceded by “at least one” or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure concerns a method for producing a steering column for a motor vehicle, which method can be carried out with the use of an extruded profile with relatively low machining complexity.

The method for producing a steering column for a motor vehicle, the steering column comprising an inner steering column tube, for receiving a steering shaft such that it can be rotated about its longitudinal axis, and an outer steering column tube which receives the inner steering column tube, the outer steering column tube having a longitudinal slot which extends in the direction of the longitudinal axis, a clamping apparatus which can be switched over between a release position, in which the inner steering column tube can be adjusted with respect to the outer steering column tube, and a fixing position, in which the inner steering column tube is fixed with respect to the outer steering column tube, the clamping apparatus comprising a clamping axle which is guided through a recess in the outer steering column tube transversely with respect to the longitudinal axis, and the longitudinal slot having a greater width in the release position than in the fixing position,
is characterized by the following method steps:
a) manufacturing of a single blank of the outer steering column tube using an extrusion process,
b) cutting of the single blank to a required component length,
c) producing of a predefined number of recesses at a predefined spacing from an end side of the blank, by means of a metal cutting operation for configuring functional elements in the outer steering column tube,
g) completing of the steering column by way of attaching of further components.

In this way, it is possible to produce different component lengths of the outer steering column tube for different steering columns solely by way of the selection of the length of the outer steering column tube and by way of final machining by means of a metal cutting operation in a single clamping process, which different component lengths are suitable for different installation situations in a modular manner. Despite the metal cutting operation, the profile of the blank which has the continuous longitudinal slot in the longitudinal direction is maintained substantially over its length, the profile structure being maintained substantially. Long and short steering columns differ only by way of method step b), by the cutting to length taking place at different positions. Identical parts can be used for completing purposes.

Metal cutting operations are to be understood to mean mechanical separating methods with a geometrically defined and geometrically undefined cutting edge, for example drilling, milling, grinding and turning. The cutting to length can take place in various ways, for example sawing, laser cutting or water jet cutting.

It is advantageous if the outer steering column tube encloses the steering shaft in one piece by more than 270°. In this way, an optimum support of the steering shaft in the outer steering column tube can be achieved. The outer steering column tube preferably encloses the steering shaft by more than 300°, as a result of which the steering column experiences a further improvement in the support and can therefore ensure a high stiffness of the supporting action.

In an advantageous way, exclusively recesses, preferably in the form of openings, and possibly additionally planar faces are introduced into the extruded blank by means of metal cutting in order to configure the outer steering column tube.

Recesses are to be understood to mean counterbores or depressions or apertures. Apertures are, for example, slots or circular-cylindrical bores or threaded bores. Exclusively bores or slots and planar faces are preferably made on the extruded profile by way of post-machining in order to configure the outer steering column tube. The recesses preferably serve as functional elements, for example for configuring adjustment slots and/or bores for guiding through the clamping axle or for receiving further components. Planar faces can be provided, above all, in the regions of the outer steering column tube which are provided as contact faces for pairing with other components. Satisfactory pairing is aided by way of said planar faces.

The method preferably comprises further method steps before method step g):

d) manufacturing of a single blank of the inner steering column tube using an extrusion process,
e) cutting of the single blank to a required component length,
f) producing of a predefined number of recesses at a predefined spacing from an end side of the blank, by means of a metal cutting operation for configuring functional elements in the inner steering column tube.

In this way, it is possible to produce for different component lengths of the inner steering column tube for different steering columns solely by way of the selection of the length of the inner steering column tube and by way of final machining by means of a metal cutting operation in a single clamping process, which different component lengths are suitable for different installation situations in a modular manner. Despite the metal cutting operation, the profile of the blank with the continuous longitudinal slot in the longitudinal direction is maintained substantially over its length, the profile structure being maintained substantially. Long and short steering columns differ only by way of method step e), by the cutting to length taking place at different positions.

It is advantageous if, in every length region of the outer and/or inner steering column tube, the cross-sectional area of the blank is reduced by at most 30% by means of the metal cutting operation for configuring the outer and/or inner steering column tube. Here, the cross-sectional area is always to be understood to mean the profile cross-sectional area, said cross-sectional area being oriented orthogonally with respect to the longitudinal axis. "In every length region of the outer and/or inner steering column tube" is to be understood to mean that the cross-sectional areas on every arbitrary length section are reduced by way of the metal cutting operation by at most 30% with respect to the non-machined cross-sectional area of the blank. Inexpensive production of the outer and/or inner steering column tube can be ensured in this way. The cross-sectional area of the blank is preferably reduced in every length region of the outer and/or inner steering column tube by at most 20%, particularly preferably 10% and very particularly preferably 5% by means of the metal cutting operation for configuring the outer and/or inner steering column tube.

It is advantageous if the completing comprises the installation of the steering shaft. The steering shaft is preferably one that is telescoped and in particular in two parts, wherein said steering shaft comprises a coupling section at one end for attaching a steering wheel.

It is advantageous if the completing comprises the attachment of a bracket.

Here, the attachment of the bracket can comprise the mounting of the clamping apparatus which contains the clamping axle which penetrates functional elements of the outer and/or inner steering column tube, for example in the form of bores and guide slots. Here, the bracket comprises at least one side cheek, it being possible for said side cheek to preferably be brought into contact with an at least partially flattened face of the outer steering column tube. In particular, a carrying element can be placed onto a linear groove or rib structure on the outer steering column tube, the carrying element serving for fastening to the body of the vehicle and being capable of being positioned and fastened simply on the steering column tube. Depending on the positioning, the fastening point can be selected without it being necessary for the steering column tube to be machined for this purpose.

Here, the carrying element can advantageously be provided with a bush which serves as fastening element on the vehicle body or the bracket and, moreover, receives the bearing shaft for a pivoting movement during a vertical adjustment of the steering column.

The steering shaft can preferably be telescoped and is inserted into the inner and/or outer steering column tube and is mounted rotatably there by means of anti-friction bearings.

It is advantageous, furthermore, if at least one anti-friction bearing is inserted into the outer steering column tube by means of an adjusting piece. The bearing seat can then be configured in the adjusting piece in a simple way.

The bearing is held reliably and produces low noise in the long-term if the adjusting piece is arranged non-rotatably in the outer steering column tube.

An adjustable steering column which is produced in accordance with the described method is also advantageous, because cost advantages arise as a result of the simple modular design and the simple production of different steering columns using identical parts for different types.

Furthermore, a steering column for a motor vehicle is proposed, the steering column comprising an inner steering column tube for receiving a steering shaft such that it can be rotated about its longitudinal axis, and an outer steering column tube which receives the inner steering column tube, the outer steering column tube having a longitudinal slot which extends in the direction of the longitudinal axis, a clamping apparatus which can be switched over between a release position, in which the inner steering column tube can be adjusted with respect to the outer steering column tube, and a fixing position, in which the inner steering column tube is fixed with respect to the outer steering column tube, the clamping apparatus comprising a clamping pin which is guided through a recess in the outer steering column tube transversely with respect to the longitudinal axis, and the longitudinal slot having a greater width in the release position than in the fixing position. According to the invention, the outer steering column tube is produced using an extrusion process, which outer steering column tube has been cut to a required component length, and has a predefined number of recesses which are arranged at a predefined spacing from an end side of the blank, the outer steering column tube enclosing the inner steering column tube in one piece by at least 270°. The outer steering column tube advantageously encloses the inner steering column tube by more than 300°.

Said steering column affords the advantage of inexpensive production and the possibility of producing different steering columns for different vehicles by way of very similar components which differ from one another only as a result of a few machining steps.

FIG. 1 shows a perspective view of a steering column with an outer steering column tube 1 and an inner steering column tube 2. In its interior, the inner steering column tube carries an upper steering spindle 3 which is mounted in an anti-friction bearing 4 such that it can be rotated about a longitudinal axis 5. The longitudinal axis 5 defines an axial direction of the steering column arrangement, in which axial direction the inner steering column tube 2 can be displaced in a similar manner to a telescope with respect to the outer steering column tube 1.

The outer steering column tube 1 is held in a bracket 6 which is provided with cutouts 7 for fastening the bracket 6 on a vehicle body. The bracket 6 furthermore has a clamping apparatus 8, which passes through the bracket 6 transversely to the longitudinal axis 5 and which permits a vertical adjustment of the outer steering column tube 1 with respect to the bracket 6 and an axial adjustment of the inner steering column tube 2 with respect to the outer steering column tube 1. For this purpose, the bracket 6 is provided with guide slots 9 and the inner steering column tube 2 is provided with a guide slot 10.

Furthermore, the outer steering column tube 1 carries a lower steering shaft or steering spindle 11 which is mounted in an anti-friction bearing (not visible here) within the outer steering column tube 1. The upper steering spindle 3 and the lower steering spindle 11 are connected to one another fixedly so as to rotate together, but so as to be able to telescope, as is customary in the prior art.

On its upper side, the outer steering column tube 1 has longitudinal grooves 12 which face away from one another and into which a carrying element 13 engages. The carrying element 13 is placed onto the outer steering column tube 1 in the grooves in a carriage-like manner in the direction of the longitudinal axis 5 and is fastened there, by way of caulking in the example. To this end, the carrying element 13 engages in a clip-like manner into the grooves 12 and engages around the upper, outer section of the outer steering column tube 1, which section lies between the grooves 12. The fastening can likewise take place by way of an oversize fit (=press fit) or adhesive bonding. Furthermore, the carrying element 13 has side walls 14 which extend upward from the grooves 12 in the mounted state according to FIG. 1, and which are oriented with their flat sides parallel to the longitudinal axis 5 and with their short end sides transversely with respect to the longitudinal axis 5. The sides 14 are provided in each case with an elongate recess 15, the longitudinal axis of which is oriented parallel to the longitudinal axis 5. A tubular bush 16 which defines a pivot axis 17 is arranged in the recesses 15 transversely with respect to the longitudinal axis 5. The pivot axis 17 is fastened to the motor vehicle and is oriented substantially transversely with respect to the driving direction and horizontally after mounting of the steering column arrangement in a motor vehicle. The pivot axis 17 serves as bearing axis for the vertical pivoting (also called vertical adjustment) of the steering column during operation.

A T-slot 18 which extends parallel to the longitudinal axis 5 is provided in the carrying element 13 between the sides 14. In its inner free cross section, the T-slot 18 carries a sliding block 19 which can be fastened in the guide element by way of a threaded bolt 20.

On its underside which also points downward during installation into a vehicle, the outer steering column tube 1 has a longitudinal slot 21, in which a downwardly pointing web 22 is guided axially, which web 22 is integrally molded in the longitudinal direction of the longitudinal axis 5 on the underside of the inner steering column tube 2 during the extrusion process for the inner steering column tube 2. During operation, the inner steering column tube 2 can be displaced in the outer steering column tube 1 for the purpose of axial adjustment of the steering column, as long as the clamping apparatus 8 is released and is therefore situated in a release position. In the case of a clamped clamping apparatus 8, the outer steering column tube 1 and therefore the longitudinal slot 21 are pulled together and the inner steering column tube 2 is clamped, in order to fix the selected axial position. A width B of the longitudinal slot 21 is reduced during clamping of the clamping apparatus 8. The width B corresponds to the extent of the longitudinal slot 21 in the direction of the clamping axle 27.

Furthermore, the inner steering column tube 2 has a circular inner cross section which can serve directly as a seat for an anti-friction bearing 4. The anti-friction bearing 4 is preferably inserted with a press-fit into the inner steering column tube 2 and mounts the driver-side end of the upper steering spindle 3 rotatably.

Figure 2:
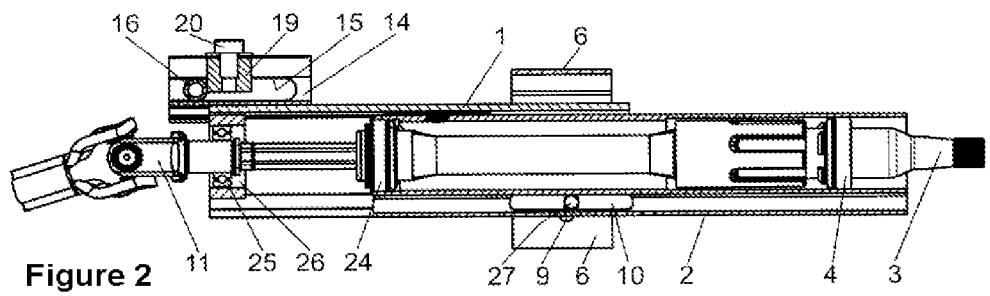

FIG. 2 shows the steering column from FIG. 1 in a longitudinal section from the side.

FIG. 2 shows the inner construction of the steering column, which inner construction comprises a second anti-friction bearing 24 for mounting that end of the upper steering spindle 3 which is remote from the steering wheel. Just like the first anti-friction bearing 4, the second anti-friction bearing 24 is inserted into the inner steering column tube 2. It is shown, furthermore, how the lower steering spindle 11 engages into the upper steering spindle 3. The two components in each case have a non-round, for example cloverleaf-shaped cross section which fits without play with respect to one another, with the result that they are guided in one another fixedly so as to rotate together, but such that they can be displaced axially and can be telescoped. On account of said guidance, the lower steering spindle 11 requires only one anti-friction bearing for rotatable mounting. The anti-friction bearing 25 is inserted by means of an adjusting piece 26 into the outer steering column tube 1 at its free end which is not penetrated by the inner steering column tube 2.

FIG. 2 also illustrates the relative position of the inner steering column tube 2 with respect to the outer steering column tube 1. The position which is shown here corresponds to a middle position within the adjustment range of the axial adjustment which is available to the driver for adapting the steering wheel distance. This can be seen by virtue of the fact that a clamping axle 27 of the clamping apparatus 8 (otherwise not visible here) lies centrally in the guide slot 10. Furthermore, in the position according to FIG. 2, the bush 16 is positioned in the recess at an end which is remote from the steering wheel. The sliding block is fastened in the T-slot 18 so as to lie directly against the bush 16, with the result that the bush 16 is fixed between the end of the recess 15 and the sliding block 19.

FIG. 2 therefore shows a middle setting of the steering column in the normal operating state.

Figure 3:
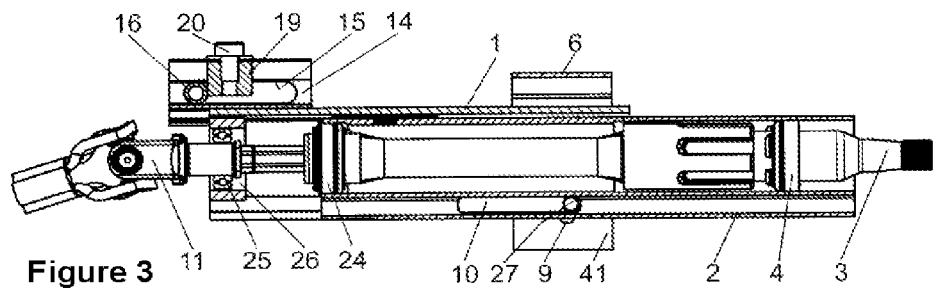

In FIG. 3 which corresponds substantially to FIG. 2, the inner steering column tube 2 is pushed into the outer steering column tube 1 to the left with respect to the outer steering column tube 1, with the result that the clamping axle 27 lies against that end of the guide slot 10 which is close to the steering wheel. Said position corresponds to an axial adjustment by way of the driver, in the case of which axial adjustment the steering wheel is at the greatest possible spacing from the driver during normal driving operation and is therefore pushed in fully.

Figure 4:
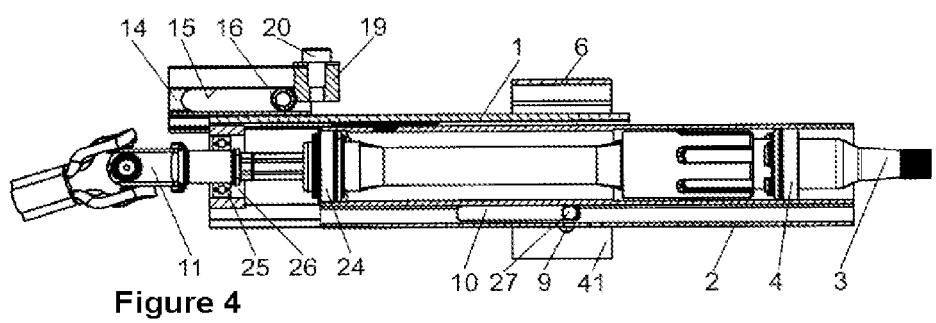

FIG. 4 shows the steering column after what is known as the crash case, that is to say after a frontal impact of the vehicle onto an obstacle, in the case of which impact the driver collides with the steering wheel. Starting from the position according to FIG. 3, the assembly comprising the steering column tubes 1 and 2, the bracket 6 and the carrying element 13 is displaced to the left, that is to say forward in the driving direction of the vehicle. Here, the bracket slides out of its fastenings on the vehicle body in the region of the cutouts 7. The magnitude of the displacement corresponds to the length of the recess 15, which can be seen by virtue of the fact that the bush 16 which is fixed to the vehicle body then lies against that end of the recess 15 which is close to the steering wheel. During the impact, the carrying element 13 is therefore also displaced under the influence of the force which is produced and acts at least with one component in the direction of the longitudinal axis 5, against the bush 16.

Here, the sliding block 19 slides along the T-slot 18. Here, the clamping force which is produced by means of the threaded bolt 20 brings about friction of the sliding block 19 within the T-slot 18, which friction leads to an absorption of energy. Said absorption of energy is desired, since it damps the impact of the driver onto the steering wheel and, as a result, reduces the risk of injury in the case of a crash.

Figure 5:
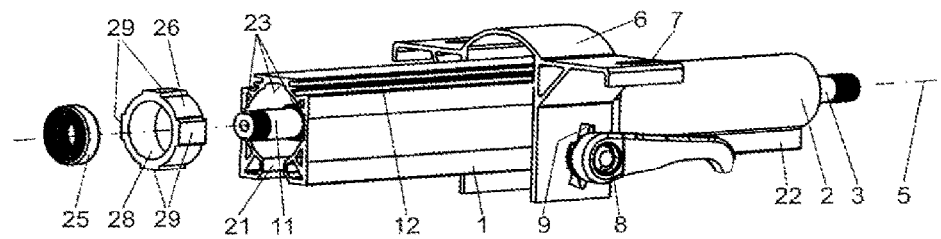

FIG. 5 shows the steering column in a perspective view of the bearing of the lower steering spindle 11 in the outer steering column tube 1, the bearing being present here in an exploded illustration. As has already been mentioned above, the outer steering column tube is produced as an extruded part and therefore has a substantially uniform cross section over its longitudinal extent in the direction of the longitudinal axis 5, which is maintained substantially over the entire length with regard to the longitudinal axis 5, without relatively great sections of the original blank having been machined by means of a machining operation. In particular, the interior space is delimited by an inner circumferential face which has four part-cylindrical faces and three rectangular grooves 23 which lie in between. The part-cylindrical faces form an approximately circular-cylindrical, tubular guide, into which the inner steering column tube 2 is inserted. The grooves 23 and the longitudinal slot 21 which is arranged at the bottom are distributed at an angular spacing of 90° and form a cross-shaped extension of the cross section which is otherwise round.

The adjusting piece 26 is inserted into said clear opening of the outer steering column tube 1, which adjusting piece 26 has a compatible outer circumferential face with attachments 29, and a circular-cylindrical annular bearing seat 28 which is arranged on the inside. The bearing seat 28 serves to receive the anti-friction bearing 25. The inner ring of the anti-friction bearing 25 in turn receives the bearing seat of the lower steering spindle 11. Therefore, the anti-friction bearing 25 mounts the lower steering spindle 11 in the adjusting piece 26, which lower steering spindle 11 is in turn fixed in the outer steering column tube 1. On account of the shaping of the outer steering column tube 1 and the adjusting piece 26 as an extruded part, the positioning of the adjusting piece 26 can take place at virtually any desired position within the outer steering column tube 1. The bearing can therefore be implemented with identical parts for different embodiments, for example of different length.

Figure 6:
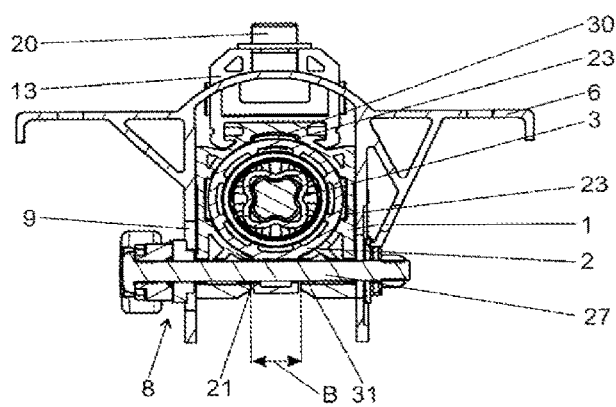

FIG. 6 shows a cross section through the clamping axle 27 of the clamping apparatus 8. Furthermore, the clamping apparatus 8 comprises a wedge plate/cam arrangement, in order to brace the outer steering column tube 1, the inner steering column tube 2 and the side cheeks 41 of the bracket 6 to one another. The clamping apparatus 8 is situated in the fixing position in the depicted cross section. In said fixing position, the width B of the longitudinal slot 21 of the outer steering column tube 1 is reduced or narrowed with respect to the release position (not shown) of the clamping apparatus 8. As a result of the reduced width B of the longitudinal slot, the diameter of that bore of the outer steering column tube 1 which serves to receive the inner steering column tube 2 is likewise reduced. As a result, the inner steering column tube 2 is clamped in the outer steering column tube 1. If the clamping apparatus 8 is transferred into the release position, the width B of the longitudinal slot 21 and therefore the diameter of the bore of the outer steering column tube 1 are increased, as a result of which the clamping action of the inner steering column tube is canceled, with the result that a displacement of the inner steering column tube in the axial direction with respect to the outer steering column tube is made possible.

Figure 7:
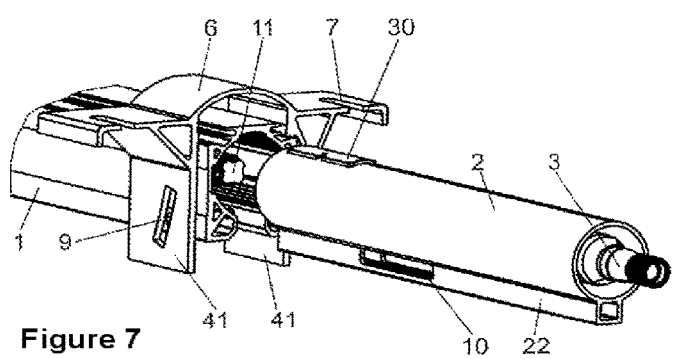

FIG. 7 shows a perspective view of the steering column, in which the inner steering column tube 2 has been pulled out of the outer steering column tube 1. The inner steering column tube 2 is configured with its web 22 which is molded at the bottom, in such a way that it fits fixedly into the outer steering column tube 1 so as to rotate with it, solely on account of the shape. Furthermore, the inner steering column tube 2 carries a sliding insert 30 on its rear upper side. The web has the guide slot 10 which is penetrated by the clamping axle 27 (not shown here) of the clamping apparatus 8. The guide slot 9 which is configured in the bracket 6 corresponds to the movement path of the clamping axle 27 with respect to the bracket 6 during an adjustment operation in the vertical direction of the steering column in the motor vehicle.

Figure 8:
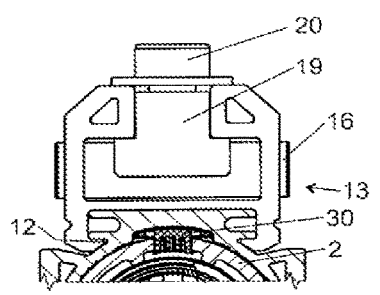

FIG. 8 shows a cross section of the guidance of the inner steering column tube 2 in the outer steering column tube 1. At the same time, FIG. 8 shows the carrying element 13 in a front view. On its upper side, the inner steering column tube 2 carries, as an anti-rotation safeguard, the sliding insert 30 which engages into the upper groove 23 of the outer steering column tube 1. The sliding insert 30 can also be produced from a self-lubricating plastic. The carrying element 13 with the sliding block 19 arranged therein in a frictionally locking manner and the bush 16 has already been described above.

Figure 9:
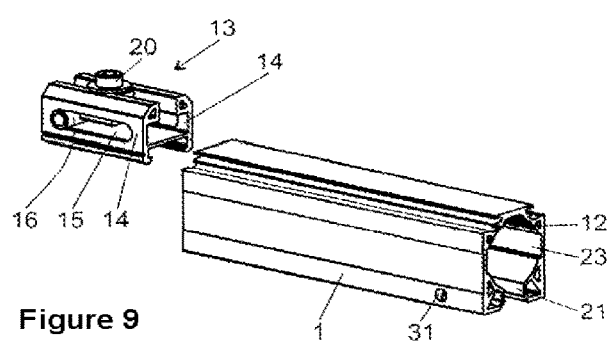

FIG. 9 shows the outer steering column tube 1 with the carrying element 13 in a separated illustration before the carrying element 13 is placed onto the steering column tube 1. In said illustration, the position of a bore 31 which receives the clamping axle 27 (not shown here) is illustrated.

Figure 10:
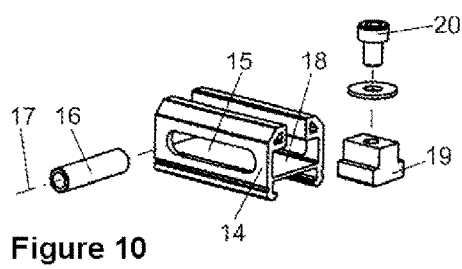

FIG. 10 shows the carrying element 13 with the sliding block 19 and the bush 16 in an exploded illustration.

Figure 11:
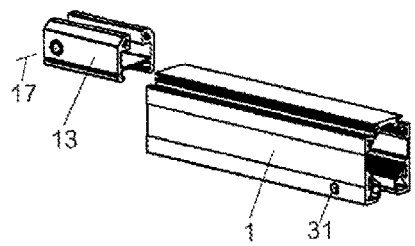

FIG. 11 shows the outer steering column tube 1 with the carrying element 13 without a sliding block and a bush in an illustration as in FIG. 9.

Figure 12:
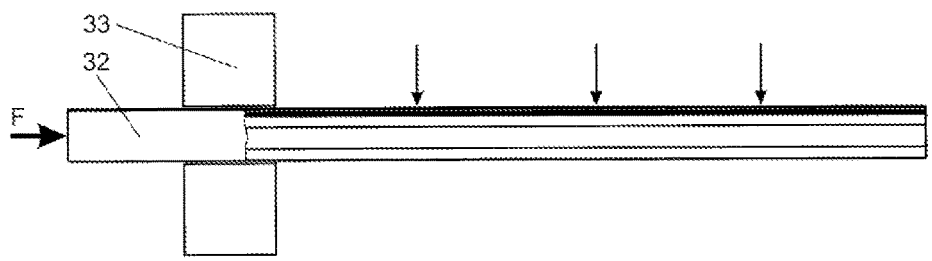

FIG. 12 illustrates a production method of the outer steering column tube 1. A material strand 32, for example comprising an aluminum alloy or magnesium alloy, is pressed through a mold 33 from the left-hand side of the figure under a pressing force F, preferably at an elevated temperature. The shaped part which is produced is then a blank with the cross-sectional shape of the outer steering column tube 1 including the longitudinal slot 21. For severing into individual workpieces, the shaped part is separated at the points which are identified by way of arrows, for example by way of sawing. The length of the workpieces can be varied by way of the selection of the separation points.

Figure 13:
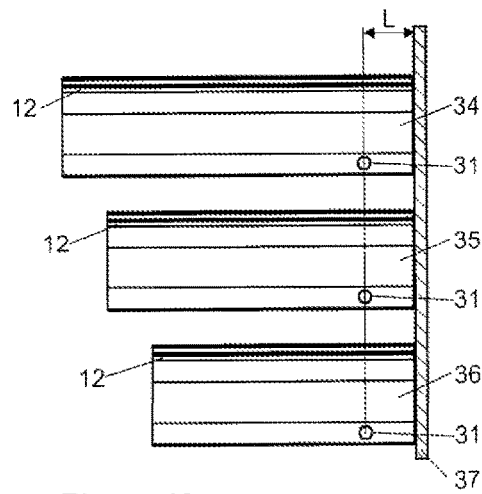

FIG. 13 shows how a long blank 34, a blank 35 of medium length, and a short blank 36 are machined by way of the attachment of functional elements. In this case, the functional elements are restricted to the bore 31 for receiving the clamping axle 27. In the case of the three blanks 34, 35 and 36, said bore is made at the same spacing L from the right-hand end face of the respective blank, illustrated here by way of a contact plate 37. All other features of the outer steering column tube 1 have been produced solely by way of the extrusion mold, as has already been described above. This applies, for example, to the grooves 12 and the other features of the inner cross section which are not visible in FIG. 13. Different component lengths are realized solely by way of the cutting to length of the blanks. The attachment of the functional elements can take place in the same apparatus, since exclusively the front end face is utilized as a reference plane.

Figure 14:
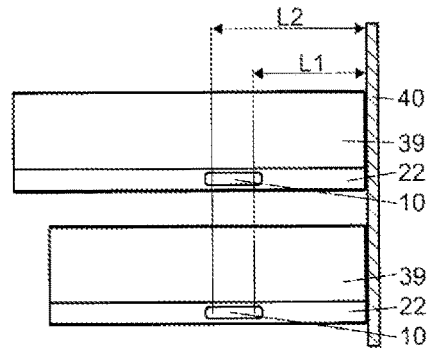

FIG. 14 shows how a long blank 38 and a short blank 39 are machined in each case to form an inner steering column tube 2 by way of the attachment of functional elements. In this case, the functional elements are restricted to the guide slot 10 which is made in the web 22. In the case of the two blanks 38 and 39, said guide slot 10 is made in the same region from L1 to L2, measured from the right-hand end face of the respective blank, illustrated here by way of a contact plate 40. All other features of the inner steering column tube 2 have been produced solely by way of the extrusion mold, as has already been described above. This applies, for example, to the web 22 and the other features of the inner cross section which are not visible in FIG. 14.

Different component lengths are realized solely by way of the cutting to length of the blanks. The attachment of the functional elements can take place in the same apparatus, since exclusively the front end face is utilized as a reference plane.

Components for steering columns of different lengths and therefore for different vehicle platforms can thus be produced in a particularly simple and inexpensive way in a single clamping operation from the same extruded part.

In so far as they can be applied, the individual features which are shown in the individual exemplary embodiments can be combined with one another and/or exchanged for one another, without departing from the scope of the invention.

LIST OF DESIGNATIONS

1. Outer steering column tube
2. Inner steering column tube
3. Steering spindle
4. Anti-friction bearing
5. Longitudinal axis
6. Bracket
7. Cutouts
8. Clamping apparatus
9. Guide slots
10. Guide slot
11. Steering spindle
12. Grooves
13. Carrying element
14. Side walls
15. Recess
16. Tubular bush
17. Pivot axis
18. T-slot
19. Sliding block
20. Threaded bolt
21. Longitudinal slot
22. Web
23. Groove
24. Anti-friction bearing
25. Anti-friction bearing
26. Adjusting piece
27. Clamping axle
28. Bearing seat
29. Attachment
30. Sliding insert
31. Bore
32. Material strand
33. Mold
34. Blank
35. Blank
36. Blank
37. Contact plate
38. Blank 39. Blank
40. Contact plate
41. Side cheek
B Width of the longitudinal slot

What is claimed is:

1. A method for producing a steering column for a motor vehicle, the steering column comprising an inner steering column tube for receiving a steering shaft such that the steering shaft is rotatable about a longitudinal axis of the steering shaft; an outer steering column tube that receives the inner steering column tube and includes a longitudinal slot that extends in a direction of the longitudinal axis; a clamping apparatus that is switchable between a release position in which the inner steering column tube is adjustable with respect to the outer steering column tube and a fixing position in which the inner steering column tube is fixed with respect to the outer steering column tube, wherein the clamping apparatus comprises a clamping axle that is guided through a recess in the outer steering column tube transversely with respect to the longitudinal axis, wherein the longitudinal slot has a greater width in the release position than in the fixing position, the method comprising:
   manufacturing a single blank of the outer steering column tube using an extrusion process;
   cutting the single blank to a required length;
   producing a predefined number of recesses at a predefined spacing from an end side of the single blank of the outer steering column by way of a metal cutting operation for configuring functional elements in the outer steering column tube;
   manufacturing a single blank of the inner steering column tube using an extrusion process;
   cutting the single blank of the inner steering column tube to a required length and reducing a cross-sectional area of the single blank of the inner steering column tube by up to 30% in each length region of the inner steering column tube; and
   attaching components to the steering column.

2. The method of claim 1 wherein the outer steering column tube encloses the steering shaft in one piece by more than 270°.

3. The method of claim 1 further comprising introducing exclusively recesses by way of material cutting into the single blank that has been extruded.

4. The method of claim 1 wherein prior to attaching the components to the steering column, the method further comprises:
   producing a predefined number of recesses at a predefined spacing from an end side of the single blank of the inner steering column tube by way of a metal cutting operation for configuring functional elements in the inner steering column tube.

5. The method of claim 4 wherein attaching the components comprises mounting the clamping apparatus such that the clamping axle penetrates the functional elements in the inner steering column tube.

6. The method of claim 1 wherein the metal cutting operation comprises reducing a cross-sectional area of the single blank of the outer steering column tube by up to 30% in each length region of the outer steering column tube.

7. The method of claim 1 wherein attaching the components comprises installing the steering shaft.

8. The method of claim 1 wherein attaching the components comprises attaching a bracket.

9. The method of claim 1 wherein attaching the components comprises mounting the clamping apparatus such that the clamping axle penetrates the functional elements in the outer steering column tube.

10. The method of claim 1 further comprising placing a carrying element onto the outer steering column tube.

11. The method of claim 10 wherein the carrying element includes a bush.

12. The method of claim 1 wherein the steering shaft is telescopic, the method further comprising mounting the steering shaft rotatably in the outer steering column tube or the inner steering column tube by way of anti-friction bearings.

13. An adjustable steering column produced in accordance with the method of claim 1.

14. A method for producing a steering column for a motor vehicle, the steering column comprising an inner steering column tube for receiving a steering shaft such that the steering shaft is rotatable about a longitudinal axis of the steering shaft; an outer steering column tube that receives the inner steering column tube and includes a longitudinal slot that extends in a direction of the longitudinal axis; a clamping apparatus that is switchable between a release position in which the inner steering column tube is adjustable with respect to the outer steering column tube and a fixing position in which the inner steering column tube is fixed with respect to the outer steering column tube, wherein the clamping apparatus comprises a clamping axle that is guided through a recess in the outer steering column tube transversely with respect to the longitudinal axis, wherein the longitudinal slot has a greater width in the release position than in the fixing position, the method comprising:
   manufacturing a single blank of the outer steering column tube using an extrusion process;
   cutting the single blank to a required length;
   producing a predefined number of recesses at a predefined spacing from an end side of the single blank of the outer steering column by way of a metal cutting operation for configuring functional elements in the outer steering column tube; and
   attaching components to the steering column;
   wherein the metal cutting operation comprises reducing a cross-sectional area of the single blank of the outer steering column tube by up to 30% in each length region of the outer steering column tube.

* * * * *